(12) United States Patent
Spaulding, Sr.

(10) Patent No.: US 7,272,906 B1
(45) Date of Patent: Sep. 25, 2007

(54) BIRD DECOY

(76) Inventor: Thomas R. Spaulding, Sr., 809 Milan, Ravenna, NE (US) 68869

( * ) Notice: Subject to any disclaimer, the term of this patent is extended or adjusted under 35 U.S.C. 154(b) by 252 days.

(21) Appl. No.: 10/281,474

(22) Filed: Oct. 25, 2002

(51) Int. Cl.
*A01M 31/06* (2006.01)

(52) U.S. Cl. .................................. 43/3; 43/2; 248/156

(58) Field of Classification Search ..................... 43/2, 43/3; 248/156
See application file for complete search history.

(56) References Cited

U.S. PATENT DOCUMENTS

| | | | | |
|---|---|---|---|---|
| 1,083,882 A | * | 1/1914 | Hindmarsh | 43/3 |
| 2,413,418 A | * | 12/1946 | Rulison | 43/3 |
| 2,501,517 A | * | 3/1950 | Honald | 43/1 |
| 2,663,108 A | * | 12/1953 | Dixon et al. | 43/3 |
| 2,691,233 A | | 10/1954 | Richardson | 43/3 |
| 2,704,908 A | * | 3/1955 | Lamkin | 40/412 |
| 2,747,316 A | * | 5/1956 | Benedetto | 43/3 |
| 2,885,813 A | | 5/1959 | Kratzert | 43/3 |
| 3,435,550 A | | 4/1969 | Carlson | 43/3 |
| 3,537,205 A | | 11/1970 | Robert | 43/3 |
| 3,736,688 A | | 6/1973 | Caccamo | 43/3 |
| 3,768,192 A | | 10/1973 | Caccamo | 43/3 |
| 3,869,823 A | * | 3/1975 | Powers et al. | 43/3 |
| 4,251,937 A | * | 2/1981 | Curley | 43/3 |
| 4,965,953 A | * | 10/1990 | McKinney | 43/2 |
| 5,003,722 A | * | 4/1991 | Berkley et al. | 43/3 |
| 5,036,614 A | * | 8/1991 | Jackson | 43/3 |
| 5,144,764 A | | 9/1992 | Peterson | 43/3 |
| 5,199,204 A | * | 4/1993 | Lowery | 43/2 |
| 5,375,363 A | | 12/1994 | Higdon | 43/3 |
| D358,862 S | | 5/1995 | Chaffin | D22/125 |
| 5,551,923 A | | 9/1996 | Worzella | 472/137 |
| 5,636,466 A | * | 6/1997 | Davis | 43/3 |
| 5,682,702 A | * | 11/1997 | McKnight et al. | 43/3 |
| 6,092,322 A | * | 7/2000 | Samaras | 43/2 |
| 6,216,382 B1 | * | 4/2001 | Lindaman | 43/2 |
| 6,266,912 B1 | | 7/2001 | Jirele | 43/2 |
| 6,293,042 B1 | * | 9/2001 | Arvanitis, Jr. et al. | 43/3 |
| 6,357,159 B1 | * | 3/2002 | Bowling | 43/2 |
| 6,360,474 B1 | | 3/2002 | Wurlitzer | 43/3 |
| 6,408,559 B2 | | 6/2002 | Mathews | 43/3 |
| 6,449,894 B1 | * | 9/2002 | Price et al. | 43/3 |
| 6,572,428 B1 | * | 6/2003 | Weiser et al. | 446/35 |
| 6,574,903 B2 | * | 6/2003 | Solomon | 43/3 |
| 2002/0017047 A1 | * | 2/2002 | Mierau | 43/3 |
| 2002/0100206 A1 | * | 8/2002 | Brint | 43/2 |
| 2002/0178639 A1 | * | 12/2002 | Dainiels | 43/3 |

FOREIGN PATENT DOCUMENTS

| | | | |
|---|---|---|---|
| EP | 0 071 461 A1 | | 2/1983 |
| GB | 20670674 | * | 7/1981 |

* cited by examiner

*Primary Examiner*—David Parsley
(74) *Attorney, Agent, or Firm*—Thomte, Mazour & Niebergall; Dennis L. Thomte

(57) ABSTRACT

A bird decoy is disclosed comprising a body having an upper body member, a lower body member and a pair of wings. The wing members are releasably coupled to the decoy using a flexible mounting assembly that allows the wings to move independently with, and in response to, the wind. The decoy is imprinted with the feather patterns and colorings of a selected species and sex of bird. A stand is removably coupled to the decoy so that the body may move slightly in response to the wind. Accordingly, the decoy mimics the realistic appearance and movement of a select species and sex of bird while remaining both durable and collapsible for easy transport and storage.

10 Claims, 5 Drawing Sheets

BIRD DECOY

BACKGROUND OF THE INVENTION

1. Field of the Invention

This invention relates to a bird decoy and more particularly to a decoy shaped to resemble one of a goose, duck, or other bird, having a body and wings that move when engaged by the wind to mimic lifelike bird movement.

2. Description of the Related Art

There are several styles of decoys, resembling many different species of birds being used by hunters and wildlife enthusiasts. Some of the prior art decoys are "full-bodied" which makes them difficult to transport from one location to another due to their bulk. Other types of prior art decoys include vertical silhouettes that are easier to store and carry into the field. However, such decoys lack the necessary realistic appearance of a live bird. Additionally, many prior art decoys lack the strength and durability needed for repeated use in the field.

One of the greatest downfalls of traditional decoys is their inability to mimic lifelike movement. Natural movement by a decoy logically completes the realism "formula" that should be used when attempting to attract birds. Prior art decoys that do provide movement are typically complex in structure and lack the durability required to last through several seasons of use in the field. Moreover, the power used by prior art decoys to generate movement is usually supplied by electrical power sources or manual effort through the use of "puppet strings" that occupy the user's attention and readiness.

Accordingly, what is needed is a bird decoy having a realistic appearance, that can simply and reliably mimic natural movement, and is capable of being easily stored and transported.

SUMMARY OF THE INVENTION

A decoy is disclosed which can closely resemble one of many different species of birds, such as geese, ducks, and other birds. The decoy is constructed such that it is easily transported and assembled. The decoy includes a horizontally disposed upper body member that is formed to define a tail portion, a back portion, a breast portion, and an abdomen portion. The body member is imprinted with the body coloring and feather patterns of a selected species of bird.

An elongated lower body member is removably secured to the upper body member adjacent the breast portion of the upper body member. The lower body member is provided with head and neck portions, which may take various shapes and positions, depending on the desired use of the decoy. The lower body member is preferably imprinted with the neck and head markings of the selected species of bird.

A pair of elongated wing members are removably coupled to the lower body member, adjacent the upper body member, using a flexible mounting assembly which allows the wings to move independently from the body of the decoy when they are engaged by the wind. The independent movement of the wings with respect to the body mimics a number of natural "flight" and "landing" wing movements. As with the upper and lower body members, the wing members are preferably imprinted with the characteristic wing markings of the selected species of bird.

An elongated stand is removably secured to the underside of the decoy and vertically inserted into the ground to support the decoy a selected distance from the ground. The design of the stand is adapted to prevent the stand from rotating in the ground and with respect to the decoy. The stand is loosely coupled to the decoy to allow a slight side-to-side movement of the decoy when it is engaged by the wind to further increase the decoy's ability to mimic natural movement.

It is therefore a principal object of the invention to provide an improved bird decoy.

A further object of the invention is to provide an improved bird decoy that closely resembles one of several species of birds including at least geese and ducks.

A further object of the invention is to provide a bird decoy that moves with, and reacts to, the wind.

Yet another object of the invention is to provide a bird decoy that maintains its position even in high winds.

A further object of the invention is to provide a bird decoy having detachable wings.

Another object of the invention is to provide a bird decoy having wings that move freely with, and react to, the wind.

Yet another object of the invention is to provide a bird decoy having a body that moves freely with, and reacts to, the wind.

Still another object of the invention is to provide a bird decoy that is easily transportable in either an unassembled or partially assembled condition.

Yet another object of the invention is to provide a bird decoy that is easily stored.

These and other objects will be apparent to those skilled in the art.

DESCRIPTION OF THE PREFERRED EMBODIMENT

Figure 1:
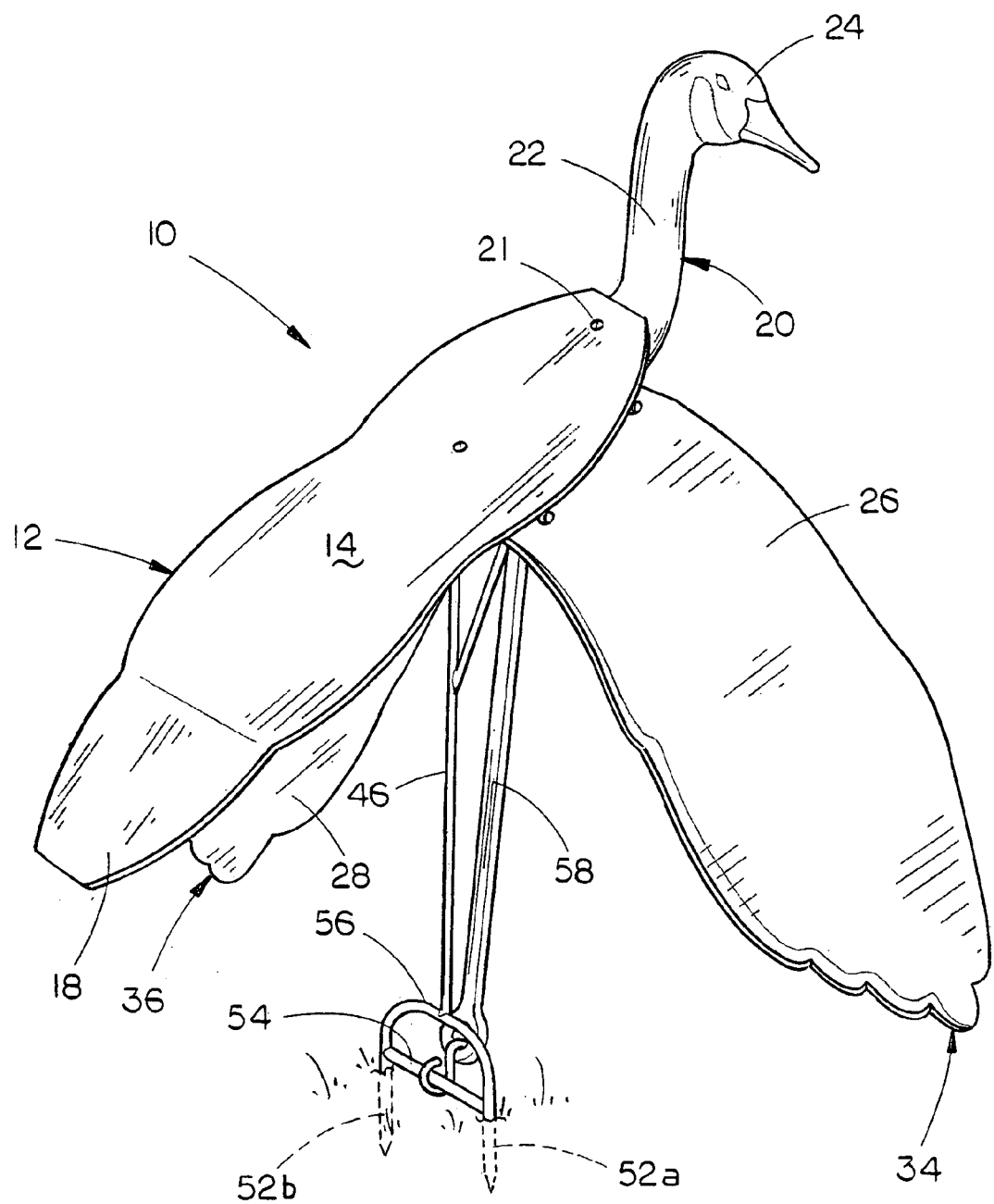
FIG. 1 is a perspective view of the bird decoy of the present invention.
Figure 2:
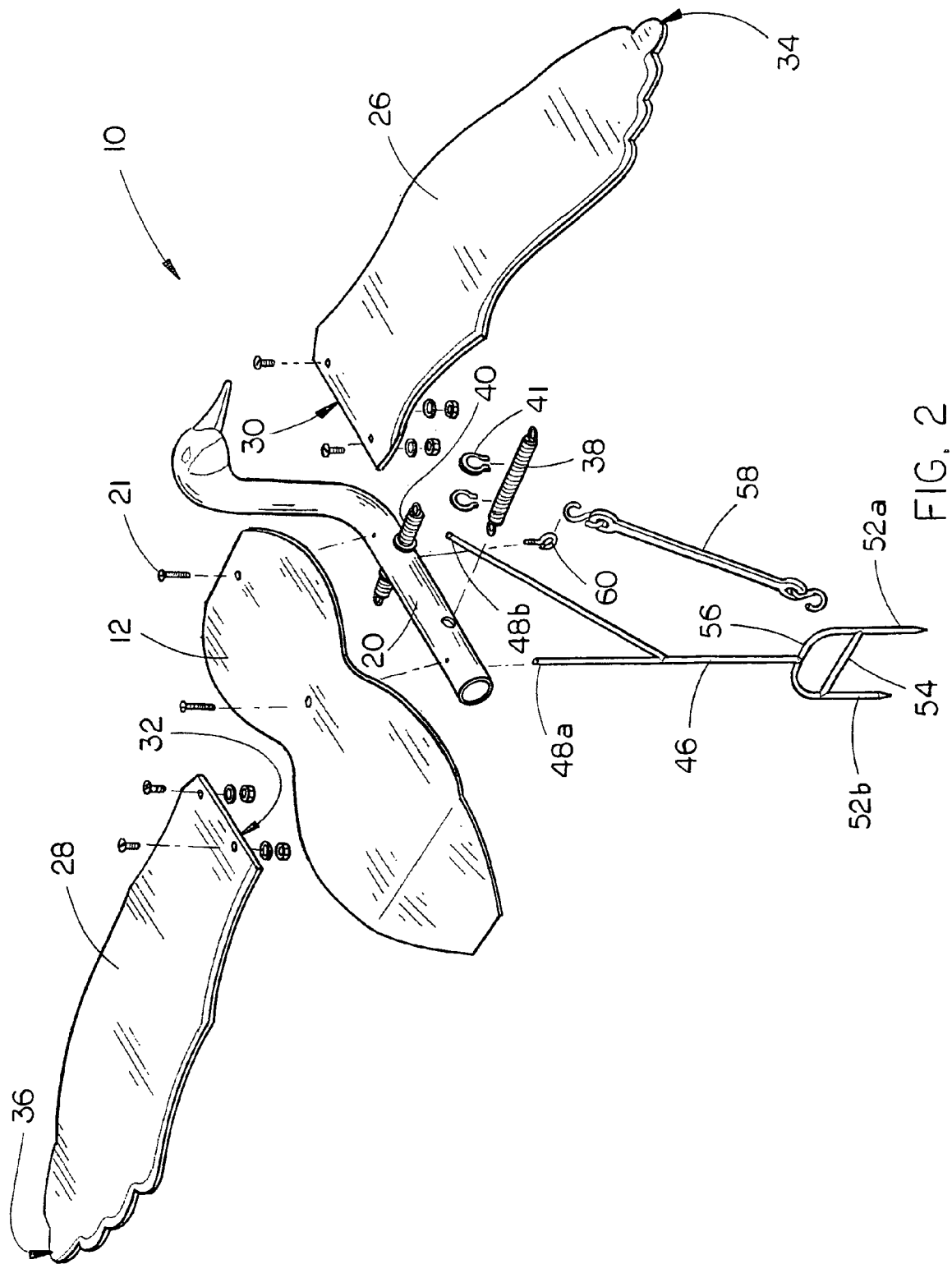
FIG. 2 is an exploded view of a preferred embodiment of the bird decoy of the present invention.
Figure 3:
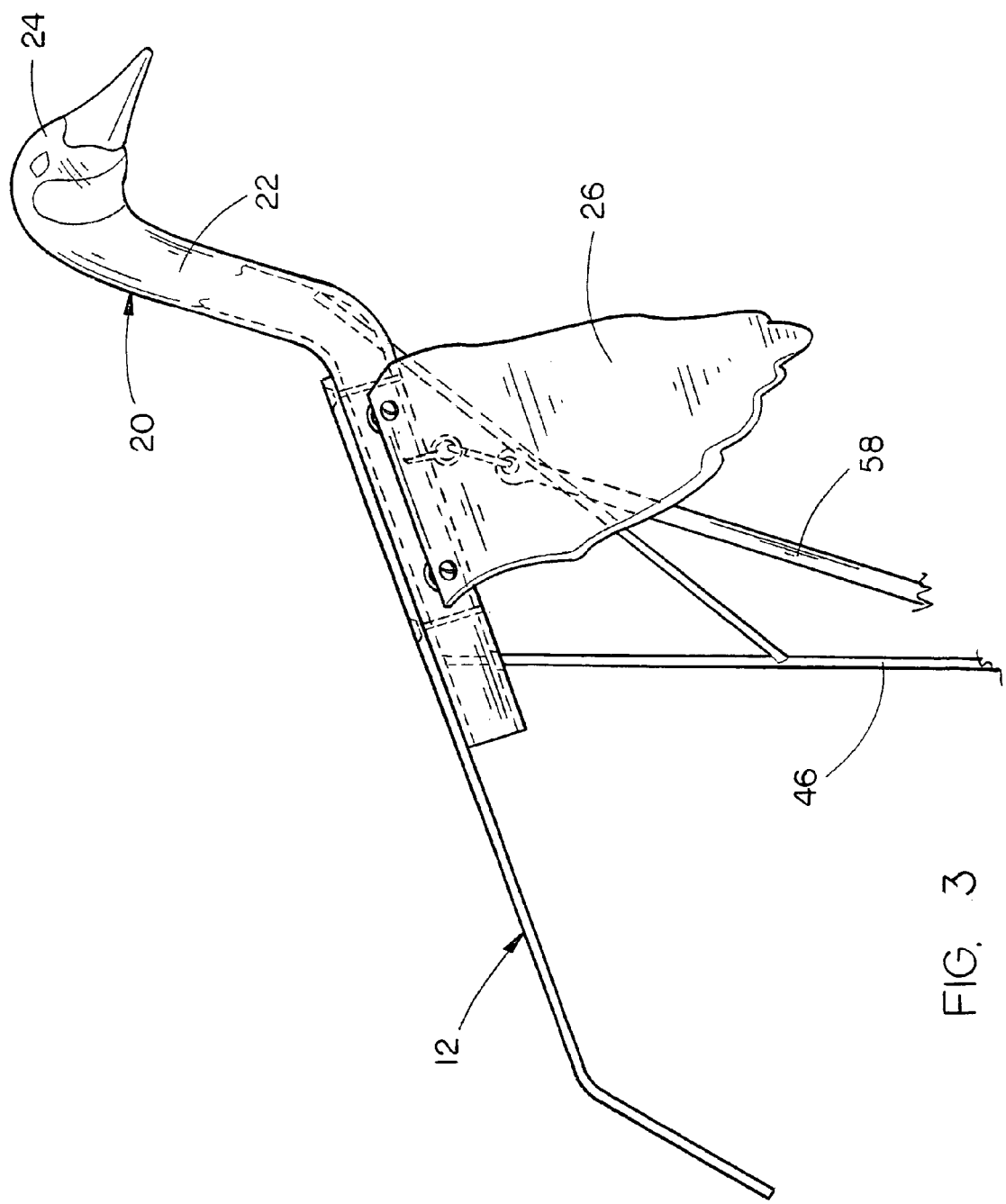
FIG. 3 is a side elevation view of the bird decoy of FIG. 2.
Figure 4:
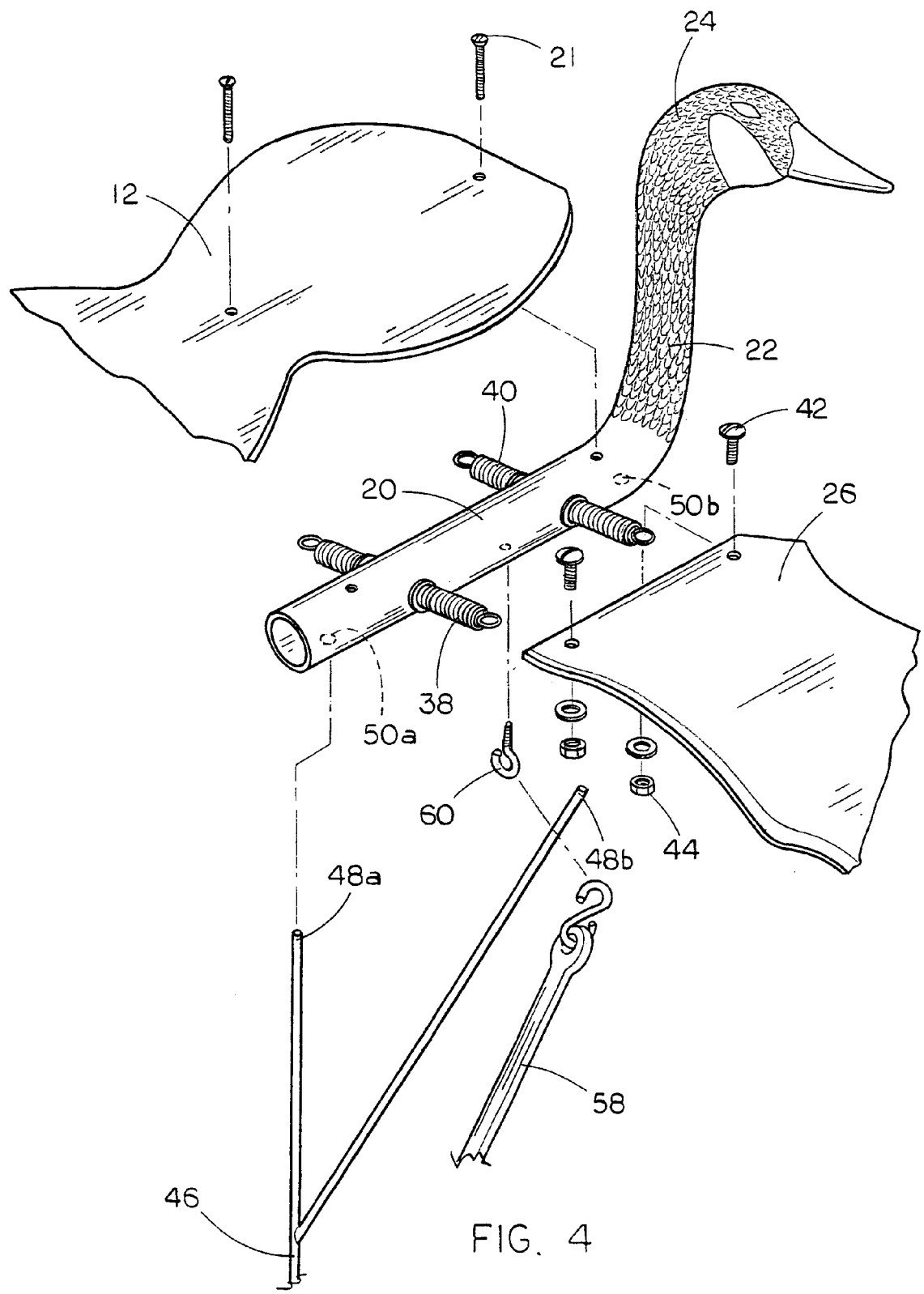
FIG. 4 is an additional exploded perspective view of the bird decoy of FIG. 2.

The bird decoy of this invention is referred to generally by the reference numeral 10 in FIGS. 1-5. For simplicity of description only, the bird decoy 10 of the present invention will be depicted and described as the same is configured to closely resemble a goose. It is contemplated that the structures described herein, and the methods of assembling the same, are equally applicable to decoys resembling geese, ducks, turkeys, pheasants, quail, and nearly any other species of bird.

The body of the bird decoy 10 is preferably comprised of a generally horizontally disposed upper body member 12 having an upper surface 14 and a lower surface 16. A tail portion 18 is formed at the rearward end of the upper body member 12. The body of the bird decoy 10 is further comprised of an elongated lower body member 20 that is removably secured to the lower surface 16 of the upper body member 12 using at least one bolt 21. Although it is contemplated that other similar fasteners could be used in place of the bolt 21, such as screws, hook-and-loop fasteners, snaps, rivets, or various adhesives. The bolt 21 and similar fasteners provide a sturdy connection between the upper body member 12 and the lower body member 20 while being easily removed for disassembly of the bird decoy 10.

The lower body member 20 is generally comprised of a head portion 24 and a neck portion 22. It is contemplated that the head portion 24 and neck portion 22 could be provided with a shape imitating the positions typically assumed by birds during certain activities, such as flying, drinking, feeding, etc. In fact, it is contemplated that the lower body member 20 could be at least partially formed of a flexible material or otherwise provided with rotating and/or hinging joints to alter the position of the head 24 and neck 22.

Wing members 26 and 28 are provided, having the general shape of bird wings, with inner edge portions 30 and 32 and outer end edge portions 34 and 36. Wing members 26 and 28 are pivotably connected to the lower body member 20 using at least one resilient hinge member 38. Two or more resilient hinge members 38 and 40 are preferably used to provide greater stability to the connection between the wings 26 and 28 to the lower body member 20. In a preferred embodiment, resilient hinge members 38 and 40 are formed from metal springs. However, it is contemplated that resilient hinge members 38 and 40 could be formed of a flexible yet resilient plastic or rubber material (or a synthetic combination thereof). The grade and type of material used to form the resilient hinge members 38 and 40 should be chosen according to the amount of movement desired by the decoy (discussed hereinbelow) as well as the horizontal positioning of the wings at rest.

In a preferred embodiment, the resilient hinge members 38 and 40 are disposed transversely through openings formed in the sides of the lower body member 20 so that the opposite end portions of resilient hinge members 38 and 40 can be releasably connected to wing members 26 and 28 using bolts 42 and nuts 44. As with the bolts 21 discussed previously, other similar methods of attachment will be understood in the art and selected for their ability to enable the wings 26 and 28 to be easily mounted and removed as well as for their durability. In this embodiment, it is preferred that retaining clips 41 be used on either side of the lower body member 20 to retain the resilient hinge members 38 and 40 and prevent the same from being unintentionally removed from the lower body member 20.

Figure 5:
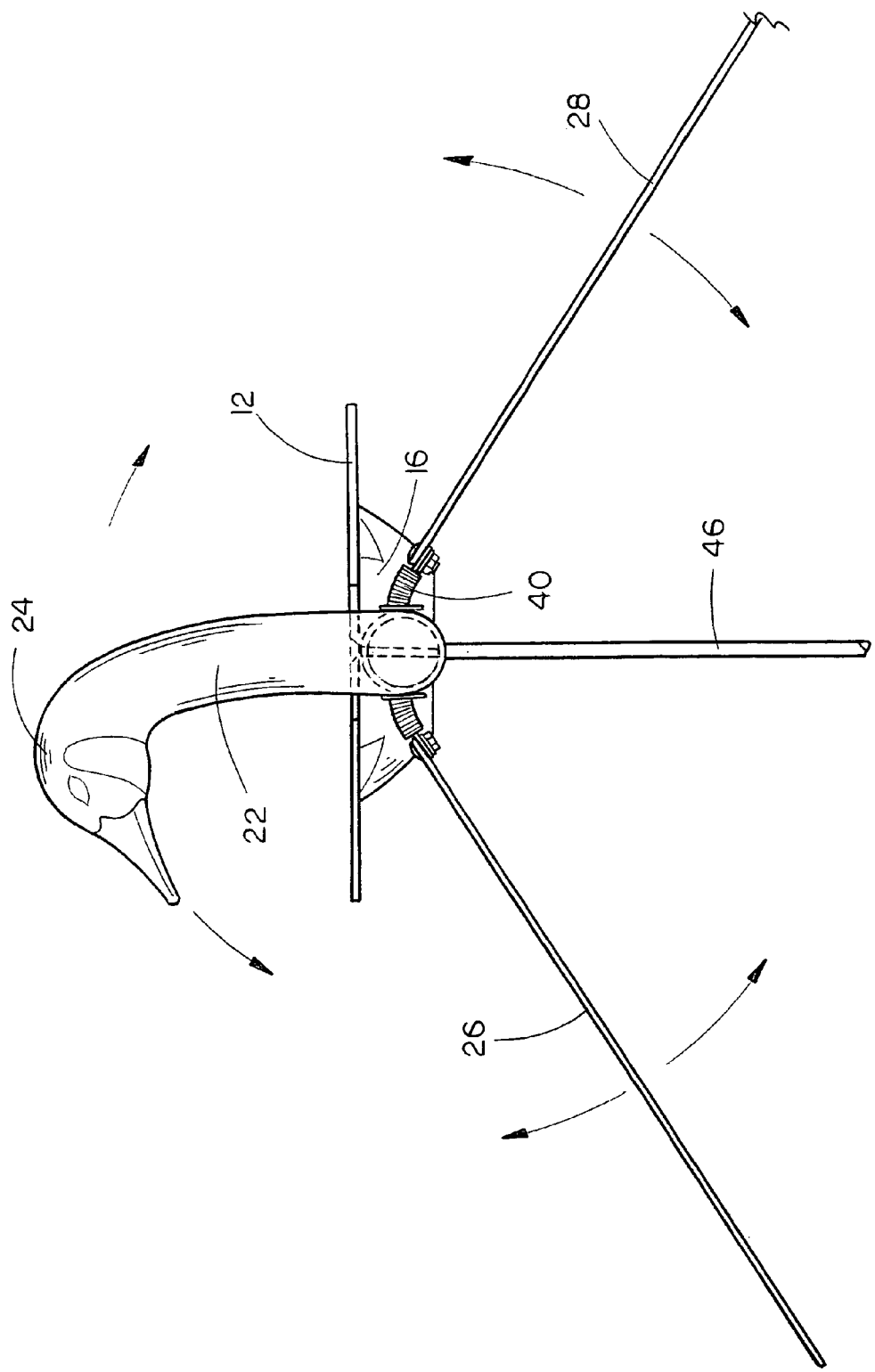
FIG. 5 is a front elevation view of the bird decoy of FIG. 2.

In an alternate embodiment, shorter resilient hinge members 38 and 40 could be secured through conventional mechanical means to the exterior of the lower body member 20, as shown in FIG. 5. This provides for true independent movement of the wings 26 and 28. In this embodiment, the wings 26 and 28 are releasably connected to the resilient hinge members as discussed previously.

An elongated support stand 46 is provided having a plurality of prongs 48A and 48B that are adapted to be received by openings 50A and 50B, which are formed in the lower surface of the lower body member 20. This arrangement provides a stable platform on which the decoy 10 can be supported. It is preferred that the openings 50A and 50B have a diameter that is greater than the cross-sectional diameter of prongs 48A and 48B. This arrangement allows the lower body portion to pivot from side to side with respect to the support stand 46. At the opposite end of the support stand 46 it is preferred that two or more prongs 52A and 52B be provided having a shape that enables them to be disposed within the ground. It is contemplated that the lower end of support stand 46 could be disposed within the ground without the use of prongs 52A and 52B. However, prongs 52A and 52B will provide rotational stability to the support stand 46 with respect to the ground. Likewise, prongs 48A and 48B prevent rotation of the decoy 10 with respect to the support stand 46 and the ground. A generally horizontal member 54 is preferably disposed between prongs 52A and 52B. The horizontal support 54 provides a surface on which the user can use his foot or other object to press downwardly and insert the prongs 52A and 52B into the ground. Moreover, the space provided between horizontal support 54 and support 56 allow the user to easily insert his hand or other instrument and pull upwardly on support 56 to remove the support stand 46 from the ground. This may be particularly helpful in those instances where the support stand 46 has become frozen within the ground.

After the assembly of the decoy 10, it can be positioned for use. It is preferred that the support stand 46 be inserted into the ground so that the forwardmost prong 48B is faced into the direction of an oncoming wind current. In this position, the support stand 46 will receive the bird decoy 10 so that its head portion 24 is pointed into the wind with its upper body member 12 and wing members 26 and 28 being positioned at a slight incline. In this position, the broad shape of the upper body member 12 and wing members 26 and 28 will engage the wind current as its passes by the bird decoy 10. As the wind current engages wing members 26 and 28, they will deflect in an upward direction a distance commensurate with the strength of the wind current and the resiliency of the resilient hinge members 38 and 40. The weight of the wing members 26 and 28 will, as the wind current fluctuates, cause the wing members 26 and 28 to move downwardly. The resilient properties of the hinge members 38 and 40 in combination with the wind current will cause the wing members 26 and 28 to mimic a natural "flapping" motion exhibited by a bird's wings in flight.

Similarly, the wind will engage the broad shape of the upper body member 12, causing the same to lift upwardly. A retaining member 58 is coupled to an eye screw 60 disposed within the lower body member 20. The opposite end of retaining member 58 is coupled to the support stand 46 at a suitable position thereon. In a preferred embodiment, the retaining member 58 is comprised of a resilient material such as rubber, plastic, or other synthetic polymer; however, it will be understood by those of skill in the art that other similar materials or rigid retaining structures made of metal, plastic or wood could be used. When the retaining member 58 is engaged, the bird decoy 10 is prevented from being lifted off of the support stand 46. Rather, the wind current causes the bird decoy 10 to pivot slightly from side to side with respect to the support stand 46. The upward and downward motion of wing members 26 and 28 will further facilitate the slight side-to-side motion of the bird decoy 10.

To provide for an additional element of visual realism, each of the upper body member 12, lower body member 20, and wing members 26 and 28 should be imprinted with markings, such as the feather patterns and colors indicative of the sex and species of the subject bird. Due to the movement and angular position of the bird decoy 10 while it is in use, it is contemplated that the feather markings and colors should be provided on both sides of the relevant structures to further the realistic appearance of the bird decoy 10.

In the drawings and in the specification, there have been set forth preferred embodiments of the invention and although specific items are employed, these are used in a generic and descriptive sense only and not for purposes of limitation. Changes in the form and proportion of parts, as well as a substitution of equivalents, are contemplated as circumstances may suggest or render expedient without departing from the spirit or scope of the invention as further defined in the following claims.

Thus it can be seen that the invention accomplishes at least all of its stated objectives.

I claim:

1. A bird decoy, comprising:

an upper body member having forward and rearward end portions and upper and lower surfaces; said upper body member being shaped to be generally two dimensional but having a peripheral edge that is shaped to resemble the body and tail portions of a bird species when the bird decoy is viewed from above;

an elongated lower body member having first and second end portions and opposite side portions; said first end portion of said lower body member being shaped in three dimensions to closely resemble the head and neck of said bird species; said second end portion of said lower body member being operatively removably coupled to the lower surface of said upper body member;

a pair of wing members, having upper and lower surfaces and inner and outer end portions, operatively pivotably secured to said lower body member; said wing members being shaped to engage a wind current and pivot between upper and lower positions with respect to said lower body member;

an elongated support stand having upper and lower ends; said upper end of said support stand being operatively pivotably connected to said lower body member; said upper end of said elongated support further being provided with a plurality of elongated prongs that are shaped and positioned to be received by a plurality of openings, having peripheral edge portions, formed in said lower body member; and at least one elongated, flexible and resilient hinge member operatively coupling the inner end portions of said wing members to said lower body member;

said upper body and lower body members being shaped to engage the wind current and pivot with respect to said support stand.

2. The bird decoy of claim 1 wherein said plurality of openings are formed to have a diameter greater than the diameter of said plurality of elongated prongs so that a space is provided between the elongated prongs and the peripheral edge portions of said openings which permits said lower body member to pivot at least from one of said opposite side portions toward the other of said opposite side portions with respect to said support stand on an axis extending generally perpendicular to said support stand beneath said lower body member, when said plurality of elongated prongs are disposed within said plurality of openings.

3. The bird decoy of claim 2 wherein the lower end of said support stand is provided with a plurality of elongated prongs that are shaped to be inserted into the ground and substantially prevent rotation of said support stand.

4. The bird decoy of claim 3 further comprising first and second generally horizontal supports disposed between said plurality of elongated prongs; said first and second generally horizontal supports being vertically spaced from one another to provide a handle for assisting a user in removing said support stand from the ground.

5. The bird decoy of claim 4 wherein said at least one elongated, flexible and resilient hinge member extends transversely through a pair of openings formed in said lower body member; said inner end portions of said wing members being coupled to opposite ends of said at least one flexible and resilient hinge member.

6. The bird decoy of claim 5 wherein said at least one elongated, flexible and resilient hinge member is a spring.

7. The bird decoy of claim 4 further comprising means for securing said lower body member to said support stand.

8. The bird decoy of claim 4 wherein at least the upper surfaces of said upper body portion and said wing members are decorated with the feather patterns of said bird species to resemble a back portion of said bird species.

9. The bird decoy of claim 4 wherein said at least one elongated, flexible and resilient hinge member is comprised of first and second elongated springs having opposite end portions; said first and second elongated springs each extending transversely through openings formed in the opposite side portions of said lower body member; said opposite end portions of said first and second springs being coupled to the inner end portions of said wing members to operatively and pivotably secure said wing members to said lower body member.

10. The bird decoy of claim 1 wherein said upper and lower body members may pivot with respect to said support stand, on an axis extending generally perpendicular to said support stand beneath said lower body member, from one side to the opposite side when said upper and lower body members are engaged by a current of wind.

* * * * *